July 7, 1931. F. J. WOLFF 1,813,334

AUDION CIRCUIT BATTERY CONTROL

Filed June 26, 1926

Inventor
Franklyn J. Wolff

Patented July 7, 1931

1,813,334

UNITED STATES PATENT OFFICE

FRANKLYN J. WOLFF, OF TRENTON, NEW JERSEY

AUDION CIRCUIT BATTERY CONTROL

Application filed June 26, 1926. Serial No. 118,767.

The purpose of the invention is to provide a single control for both the filament and plate batteries of an audion circuit, whereby the filaments may be lighted prior to the circuit on the plate being closed, so that reactivation of the audion may take place without removal from its normal position in the circuit.

With this purpose in view, the invention consists in a construction and combination of parts of which a preferred embodiment is illustrated in the accompanying drawings, wherein.

Figure 1:
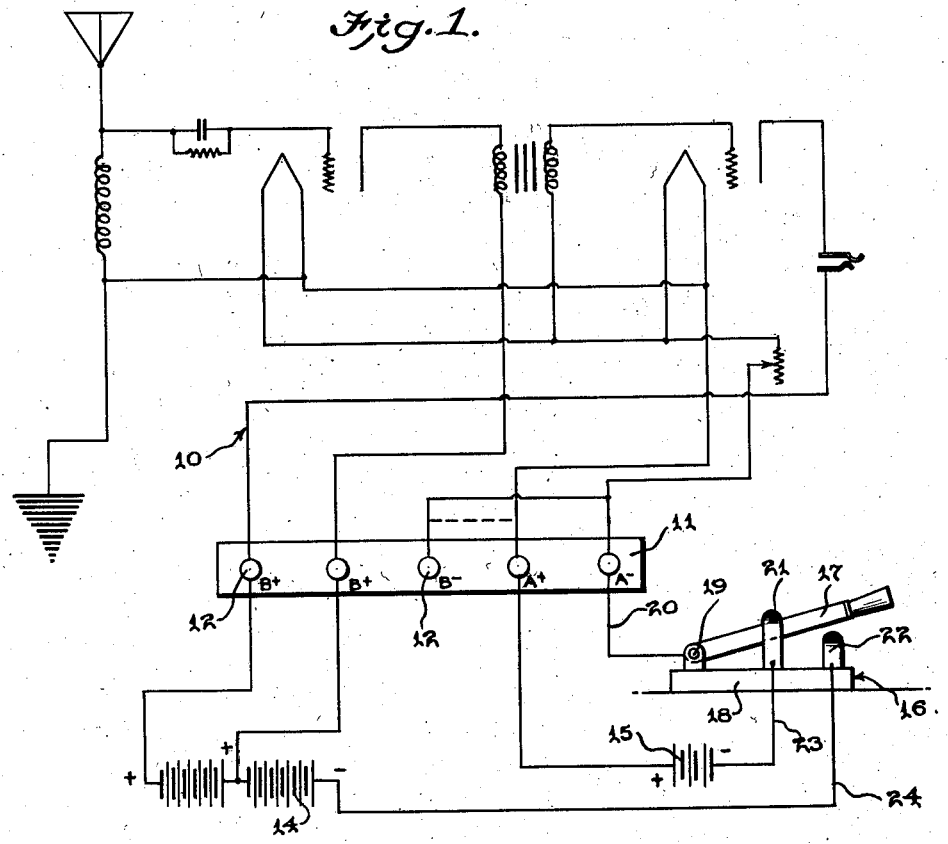
Figure 1 is a diagrammatic view of an audion circuit including one stage of amplification and the plate and filament batteries, the position of the control switch constituting the invention being shown.
Figure 2:
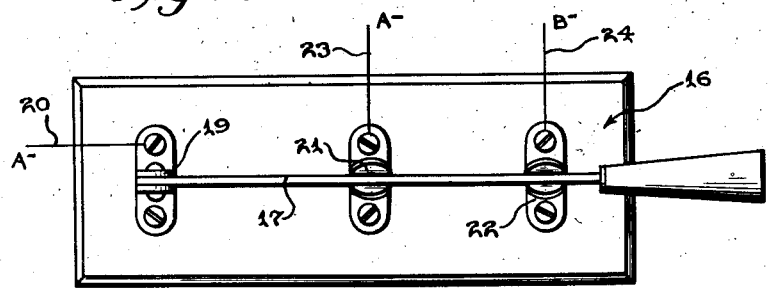
Figure 2 is a top plan view of the control switch.

While the invention is obviously applicable to any sort of an audion circuit comprising plate and filament batteries, it is illustrated as used in connection with the simple audion circuit diagrammatically indicated at 10, the plate and filament leads of which are brought to the terminal block 11 for connection with the binding posts 12. The use of the invention involves no modification of the ordinary connection of the batteries with the circuit other than that it necessitates bringing the minus terminals of the plate battery 14 and the filament battery 15 to the circuit closer 16, the latter in turn being connected to the binding post 12 representing the minus terminal of the filament battery.

In the illustrated form of the invention, a knife switch 17 is employed, this being supported on a base 18 by means of a hinge clip 19 of which the latter is connected to the minus A binding post, as indicated at 20. The bifurcated clip 21 with which the switch 17 may engage is positioned at an intermediate point between the hinge clip 19 and the outer forked clip 22 with which the switch also may engage. The clip 21, however, is of greater length than the clip 22 and accordingly in the closing operation, the switch engages the clip 21 in advance of engaging the clip 22. Since the clip 21 is connected to the minus terminal of the filament battery, as indicated at 23, the circuit on the filament battery will be closed ahead of closing the circuit on the plate battery of which the minus terminal is connected with the clip 22, as indicated at 24. Therefore, if the switch 17 be moved into engagement with the clip 21 and permitted to remain in this position for a short period, say three or four minutes, the audion filaments will be energized with no potential present on the plates. Thus the coating of the filaments will be caused to flow back to them from the plate or elsewhere that it may have been deposited in the tubes. The filaments having thus been permitted to burn a short while to restore their coating, a further movement of the switch into engagement with the clip 22 will result in closing the plate battery circuit.

It is immaterial whether the positive or negative leg of the filament be used for the plate battery return for the effective use of the invention and the diagrammatic view illustrated in Figure 1 shows by full line the plate battery return on the negative leg and by dotted line on the positive leg.

The invention may be carried out by any form of switch that will provide for closing the filament battery circuit ahead of the plate battery circuit but the knife form illustrated is probably the most simple.

The incorporation of the invention in radio receiving sets, where the best arrangement of tubes as detectors and amplifiers has been secured, will result in maintaining the tubes in the best condition and will obviate the necessity for their removal from the sockets for reactivation with its consequent experimentation to again find the best arrangement.

The invention having been described, what is claimed as new and useful is:

1. In an audion circuit in which a switch is interposed in the common leg of the plate and filament circuits, the method of maintaining the activated condition of the filaments which comprises operating the switch to first close the filament circuit, and after an appreciable time further operating the switch to close the plate circuit without opening the filament circuit.

2. In combination with an audion circuit including plate and filament circuits and separate energizing means for said plate and filament circuits, a three pole control switch having a movable element to electrically connect or disconnect said poles, one of said poles being connected in the common leg of the plate and filament circuits and the other poles respectively connected one to each of the remaining terminals of said energizing means, said movable element being actuable to first close the filament circuit and thereafter to close the plate circuit without opening the filament circuit, said movable element being retainable in either of its two circuit closing positions.

In testimony whereof he affixes his signature.

FRANKLYN J. WOLFF.